Nov. 28, 1950     H. E. PETRICK ET AL     2,531,698
OUTLET BOX WALL AND CABLE CLAMP
Filed Sept. 6, 1945
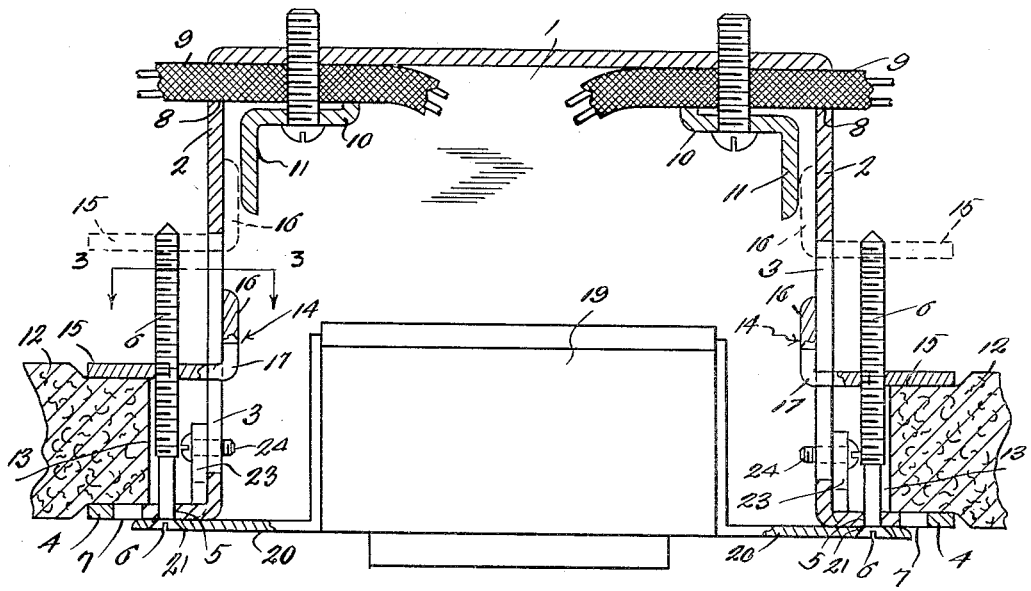
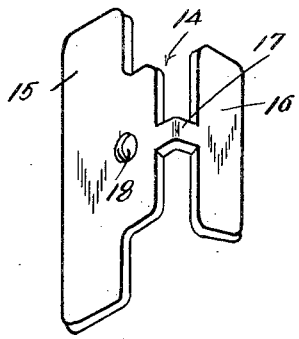
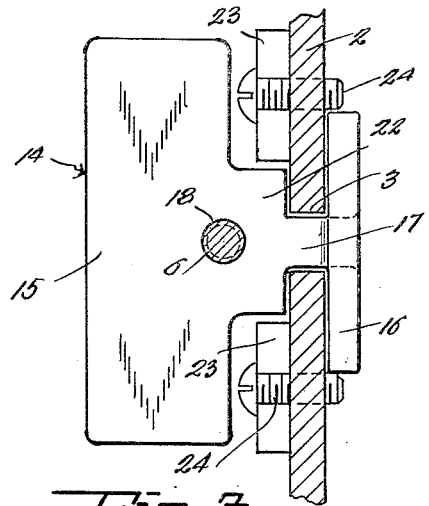
Harry E. Petrick
John Lyman Johnson
INVENTORS
BY
ATTORNEY Patented Nov. 28, 1950

2,531,698

UNITED STATES PATENT OFFICE 2,531,698

OUTLET BOX WALL AND CABLE CLAMP

Harry E. Petrick and John Lyman Johnson, Cheney, Wash.

Application September 6, 1945, Serial No. 614,776

1 Claim. (Cl. 220—3.6)

This invention relates to outlet boxes and it is one object of the invention to provide an outlet box with improved means for securing the same through an opening in a wall or ceiling.

Another object of the invention is to provide an outlet box with securing means including clamps which may be passed through slots in walls of the box after the box has been thrust through the opening in the wall or ceiling and then turned to a position in which outer jaws of the clamps will be disposed transversely of the slots and screws passed through openings in the jaws to draw the jaws into gripping engagement with the inner surface of the wall or ceiling and firmly hold the box in place.

Another object of the invention is to provide an outlet box with clamps so formed that after they have been passed through slots in walls of the box and turned to position for use they may slide longitudinally of the slots but be held against slipping through the slots out of operative engagement with the walls of the box.

Another object of the invention is to provide an outlet box with clamps so formed that after they have been passed through slots in the walls of the box they may be temporarily held in an elevated position by engagement of inner portions of the clamps with cable-engaging clips mounted in the box.

Another object of the invention is to provide an outlet box wherein the screws which hold the insert in the box may also serve as means for moving the clamps into and out of position for gripping portions of the wall or ceiling bordering the opening through which the box is mounted.

The invention is illustrated in the accompanying drawings wherein:

Fig. 1 is a sectional view showing the improved outlet box mounted through an opening in a wall or ceiling.

Fig. 2 is a perspective view of one of the clamps.

Fig. 3 is a fragmentary sectional view taken along the line 3—3 of Figure 1.

The outlet box 1 is of conventional size and has its opposed end walls 2 formed with longitudinally extending slots which terminate in spaced relation to the open outer end of the box. Flanges or brackets 4 extend from outer ends of the walls 2 and are formed with openings 5 for receiving screws 6 and also with the usual opening 7 for reception of screws by means of which a face plate is to be removably secured to the box. Near the inner end of the box the walls 2 are formed with openings 8 for insertion of electric cables 9 which are secured by clips 10 having flanges 11 which are spaced from the walls 2 of the box.

In order that portions of a wall or ceiling 12 bordering an opening 13 through which the box 1 is fitted when installed for use may be gripped and the box firmly held in place there have been provided clamps 14. These clamps are of duplicate construction and each is formed of stiff metal and has an outer jaw or plate 15 and an inner anchoring plate or cross strip 16 connected with the outer plate or jaw by an angular strip 17. The strip 17 is of such width and the metal from which the clamp is formed of such thickness that the outer clamping plate 15 and the strip 17 may be passed outwardly through a slot 3 and the clamp then turned from a position in which the plate 16 extends longitudinally of the slot to an operative position in which the plate 16 will be disposed transversely of the slot and have flat face to face engagement with the inner surface of the wall of the box. The outer plate or jaw 15 will then extend perpendicularly in crossed relation to the slot and the opening 18 formed in the jaw or plate will be disposed in alinement with the opening 5 of the bracket or flange 4 over which the jaw is disposed and the screw 6 passed through the opening 5 in this bracket may be engaged through the threaded opening of the jaw and turned to advance the clamp to a clamping position.

When the improved outlet box is in use, it is passed through the opening 13 and the clamps then applied by passing their plates or jaws 15 and strips 17 outwardly through the slots 3 and turning them to the operative position shown in Figure 1. The clamps are then thrust along the slots to the retracted position indicated by dotted lines, and since the anchoring plates will engage between the walls of the box and the flanges 11 of the clips 10, the clamps will be frictionally held in the retracted position. The insert 19, which is of conventional construction and provided with the usual arms 20, is then fitted into the box through the open end thereof and its arms pressed into engagement with the brackets 4 of the box. Screws 6 are then passed through the openings 21 of the arms 20 and through the openings 5 of the brackets 4 and the tapered ends of the screws engaged in the threaded openings 18 of the jaws 15, after which the screws are turned by a screw driver to engage threads of the screws with the threads of the openings 18 and cause the clamps to be shifted along the walls 2 of the box and their jaws 15 brought into contact with the inner surface of the wall or ceiling 12. Continued tightening of the screws will cause the wall or ceiling to be gripped between the brackets 4 and the jaws 15 and the box will be firmly held in place and the insert secured in the box. Each clamp has its jaw 15 formed with a reduced inner side portion or neck 22 so that if thin wall boarding is used for the wall or ceiling the necks may move into place between blocks 23 secured to the walls 2 of the box by screws 24 and hold the jaws in position for effecting gripping of the wall board between the brackets 4 and the jaws. The blocks 23 also serve to brace the brackets at their junction with the walls of the box and prevent them from being broken from the box.

Having thus described the invention what is claimed is:

An outlet box open at its outer end and having a bottom and side walls and end walls, outstanding flanges extending laterally from outer ends of said end walls and formed with openings, said end walls being formed with longitudinally extending slots and at their inner ends being formed with cable-receiving openings spaced from inner ends of said slots, cable engaging clips each having a base portion and a tongue extending from its base portion, screws passing through the base portions of said clips and engaged through threaded openings formed in the bottom of said box and tightened to hold the clips in gripping engagement with cables passed through the cable-receiving openings and between the clips and the bottom of the box, the tongues for said clips being spaced from said end walls and terminating in spaced relation to inner ends of said slots, clamps each having an outer clamping plate projecting laterally from an end wall of the box and a strip extending from the outer plate through the slot of the end wall of the box and carrying an inner anchoring plate disposed flat against the said end wall in bridging relation and extending towards the bottom of the box, the inner plates of said clamps being of greater depth than the distance from the slots of the end walls to outer ends of the tongues of said clips whereby the inner plates may be moved into position between the end walls and the tongues and gripped by the said tongues and screws passing through openings in the flanges of the end walls and threaded through openings in the outer plates of the clamps for shifting the clamps towards and away from the flange of the box.

HARRY E. PETRICK.
JOHN LYMAN JOHNSON.

REFERENCES CITED

The following references are of record in the file of this patent:

UNITED STATES PATENTS

| Number | Name | Date |
|---|---|---|
| 916,436 | Greenfield | Mar. 30, 1909 |
| 1,760,663 | Rosenfield | May 27, 1930 |
| 2,039,550 | Norton | May 5, 1936 |
| 2,044,650 | Thompson | June 16, 1936 |
| 2,378,529 | Austin, Jr. | June 19, 1945 |